March 19, 1929.   K. KARNATH   1,705,481
MECHANICAL MOVEMENT
Filed March 30, 1928
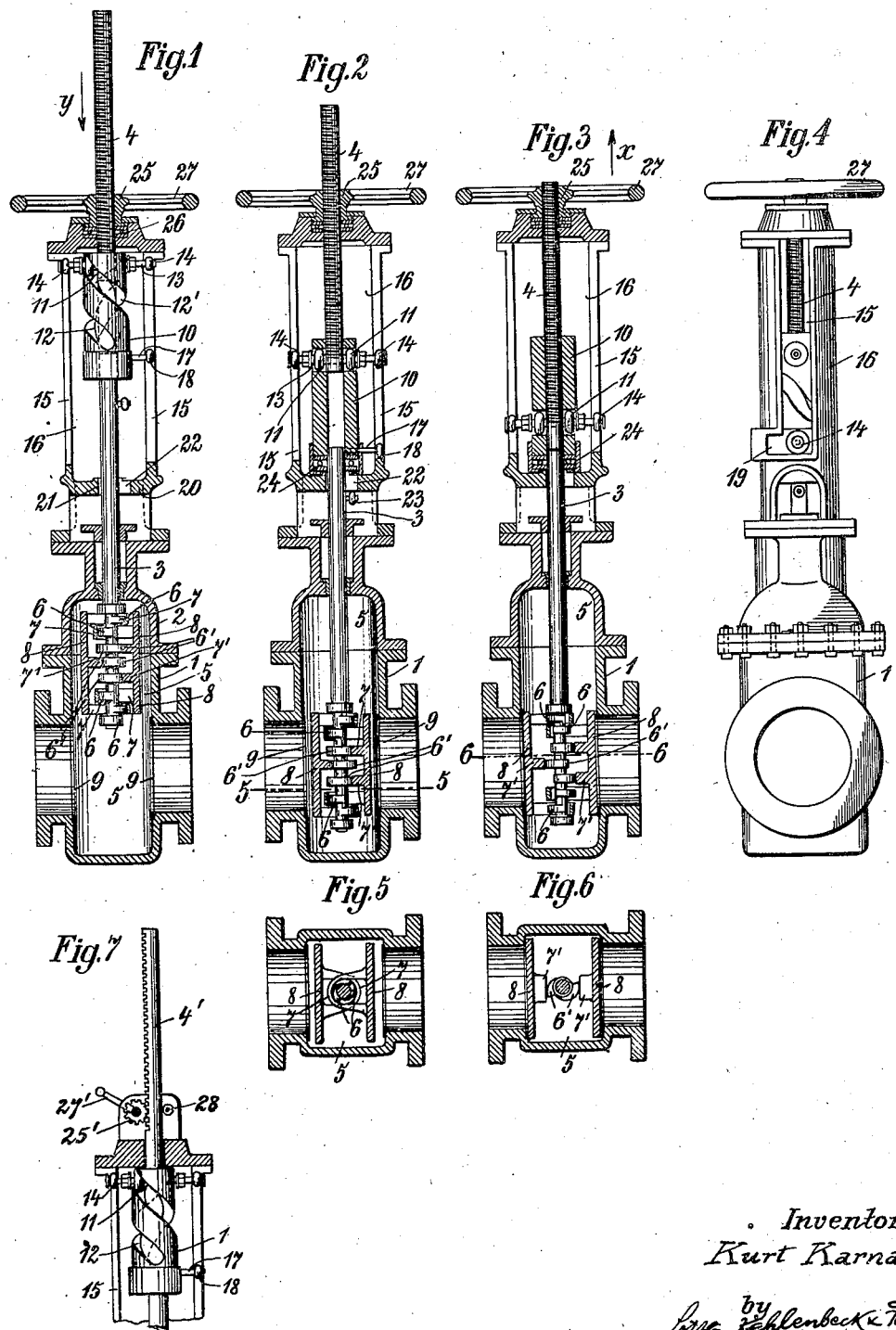
Inventor
Kurt Karnath
by Kehlenbeck & Farley
Attorneys Patented Mar. 19, 1929.

1,705,481

UNITED STATES PATENT OFFICE.

KURT KARNATH, OF ZWEIBRUCKEN, GERMANY.

MECHANICAL MOVEMENT.

Application filed March 30, 1928, Serial No. 265,971, and in Germany November 21, 1927.

My invention relates to mechanical movements, and has for its object to provide a simple and efficient mechanism for operating parts that are to be given successively two different movements and particularly, movements in two directions transverse to each other. As instances of cases in which my invention is applicable, I will mention valves of a certain type (a specific example of which is disclosed herein in detail), and doors or gates which have one movement for bringing them into and out of registry with the opening they control, and another movement to bring them, while in registry with such opening, into or out of sealing position; the doors for closing the passages in ships' bulkheads, or porthole covers may be actuated readily by mechanism of the character disclosed herein. In the example illustrated by the drawings, my improved mechanism is employed for operating valves of the type having two motions, one substantially in line with the path of the fluid, and the other transversely thereto. Devices of this type have been constructed hitherto with one or two valve members or plates operated by means of a spindle provided with cams for seating or unseating the valve or valves, according to the direction in which the spindle is rotated. The transverse movement of the valve or valves, to bring them into or out of registry with their seats, is effected by moving the spindle and the valve or valves lengthwise of the (usually vertical) spindle axis. In prior constructions, the spindle has been made of two axially aligning portions connected so as to move in unison axially, but rotatable independently. The outer portion of the spindle was threaded so as to produce an axial movement of the spindle when said outer portion was rotated, as by means of a handwheel. The inner portion of the spindle was provided with the cams for seating or unseating the valve or valves, and a separate mechanism served to turn the inner portion of the spindle when in operative relation to the valve seat or seats. This prior construction, therefore, was complicated, requiring the provision of two separate mechanisms and their successive operation.

According to my present invention, the entire operation is effected by means of a single mechanism. For this purpose, in the embodiment illustrated, the inner valve-carrying portion of the spindle is held against rotation during its longitudinal motion, but is automatically released for rotation in its innermost position; the outer portion of the spindle is connected with said inner portion in such a manner as to permit not only relative rotation of such spindle portions, but relative longitudinal movement as well, and the longitudinal movement of the outer or actuating portion of the spindle relatively to the inner or valve-carrying portion is caused to produce rotation of the said inner spindle portion. A single operating member, for instance a handwheel, will suffice for performing all the operations automatically in the proper succession. Thus, assuming the valves to be closed, rotation of the handwheel in one direction will first move the outer spindle portion outwardly through part of its stroke, and at the same time rotate the inner spindle portion (without longitudinal movement) to move the valves off their seats; during the further outward movement of the outer spindle portion the inner spindle portion will be held against rotation and moved outwardly, together with the valves, in unison with said outer portion. Similarly, when it is desired to restore the valves to the closed position, the handwheel will be turned in the opposite direction, and at first both spindle sections will move inwardly in unison, the inner section being held against rotation during such period; during the further inward movement of the outer spindle section, the inner spindle section will be held against longitudinal movement, but will be rotated by mechanism actuated by such further inward movement of the outer spindle section.

Without desiring to restrict myself to the specific details illustrated, I will now proceed to describe two typical and satisfactory embodiments of my invention, as illustrated by the accompanying drawings, in which Figs. 1, 2 and 3 are longitudinal or axial sections of the improved mechanism, showing the same in three different positions: Fig. 4 is a side elevation looking in a direction at a right angle to the other views; Figs. 5 and 6 are sections on lines 5—5 and 6—6 respectively, of Fig. 3; and Fig. 7 is a partial section of another form of my invention.

The valve casing is shown as consisting of a lower portion or body 1 and an upper or outer portion 2. Within this casing is arranged a spindle consisting of an inner portion 3 and an outer portion 4 in axial alignment with said inner spindle portion 3. The latter extends through a chamber 5 and is provided therein with four projections or cams 6 cooperating with arms 7 on the valves 8 to move the latter off their seats, when such cams are given a certain position. The spindle portion 3 is also provided, within the chamber 5, with three additional projections or cams 6', co-operating with lugs 7' on the valves 8 to press the latter against their seats. The valves are of the disk or plate type, and the chamber 5 is of sufficient size to have the valves leave the passage through the pipe unobstructed when they are lifted into the upper portion of said chamber.

The inner or lower spindle portion 3 passes with a fluid-tight fit through the upper or outer wall of the chamber 5, and is adapted to slide and also to turn in said wall. The connection between the two spindle sections 3, 4 is effected by means of a sleeve 10 and rollers 11. The sleeve 10 is secured to said spindle portion 3 rigidly and has a smooth bore of sufficient diameter to allow the spindle portion 4 to slide therein freely, notwithstanding the fact that said spindle portion has a screw thread, for a purpose stated hereinafter. This sleeve 10 is provided with two helical slots 12, 12' into which are fitted the rollers 11 mounted to turn on a transverse pin 13, which is rigidly secured to the outer spindle portion 4 and extends through said slots, the rollers 11 being guided by their engagement with the walls of the slot. The ends of the pin 13 project outwardly beyond the rollers 11 and the sleeve 10, and on such projecting ends are rotatably mounted rollers 14. These rollers are adapted to move in longitudinal slots 15 provided in opposite sides of a column or housing 16 secured rigidly to the outer portion 2 of the valve casing. At its lower end, the sleeve 10 is provided with a transverse pin 17 on which is rotatably mounted a roller 18 guided in one of the slots 15 of the housing 16. This slot is of the bayonet type, having a transverse extension 19 at its lower or inner end. Below this extension the housing 16 has an internal partition 20 perforated at 21 for the passage of the inner spindle portion 3. The perforation 21 is provided at one side with an enlargement 22 through which a roller 23 carried by the inner spindle portion 3 is adapted to pass. A ball bearing 24 is located at the lower end of the sleeve 10 in order that the latter may rotate with a minimum of friction after coming in contact with the partition 20 as in Figs. 2 and 3. The upper threaded part of the outer spindle portion 4 fits a corresponding internal screw thread on the hub portion 25 of a handwheel 27 journaled in the outer end of the housing 16 in such a manner that the handwheel can not move axially. A ball bearing 26 is preferably arranged to engage the inner end of the hub 25.

The operation is as follows: Fig. 1 shows the valves 8 open and withdrawn into the outer portion of the chamber 5; this is one of the extreme positions. In order to close the valves, the handwheel 27 is rotated in the proper direction (for instance clockwise) to lower the outer spindle portion 4, as indicated by the arrow $y$ in Fig. 1. The rollers 14 traveling in the longitudinal slots 15, keep said spindle portion from rotating, and the roller 18, traveling in one of said slots, prevents rotation of the sleeve 10 and of the inner spindle portion 3 which is rigid with said sleeve. Thus, as long as the rollers 14 and 18 are within the longitudinal slots 15, the rollers 11 will remain at the upper or outer end of the sleeve 10, as shown in Figs. 1 and 2, the spindle portions 3 and 4 sliding inwardly in unison with the sleeve 10, without any rotation. When the sleeve 10 comes in contact with the partition 20 (Fig. 2), such inward movement is arrested automatically, and in this position the valves 8 are in registry with their seats, but still out of contact therewith. During the inward movement of the spindle portion 3, the roller 23 thereon has passed from a position above the partition (Fig. 1) through the enlargement 23 of the perforation 21, to a position below such partition (Fig. 2), and when the sleeve 10 comes in contact with said partition, the roller 18 registers with the transverse extension 19 at the inner end of the respective longitudinal slot 15 (Fig. 4). If then the rotation of the handwheel 27 is continued, the rollers 11 carried by the outer spindle portion 4 will travel toward the inner end of the sleeve while the latter, not being restrained any longer by the engagement of the roller 18 with the slot 15, is given a partial rotation by the inward (downward) pressure of the rollers 11 against the helical surfaces of the slots 12, 12'. This partial rotation of the sleeve 10 will bring the roller 18 from the right-hand end of the transverse slot extension 19 to the left hand end thereof. Since the spindle portion 3 is secured rigidly to the sleeve 10, said partial rotation of the sleeve will produce a like rotation of the spindle portion, and the three cams 6' will act on the lugs 7' to press the valves 8 against their seats, as indicated in Fig. 3. This is the other extreme position of the mechanism.

The reverse operation is employed to bring the parts from the position (Figs. 3 and 4) in which the valves 8 are closed, to the original position (Fig. 1) in which the valves are open and shifted out of the path of the fluid. That is, the handwheel 27 will be rotated in the direction opposite to the one first employed, causing the outer spindle portion 4 to be moved lengthwise outwardly, as indicated by the arrow x in Fig. 3, rotation of such spindle portion being prevented by the engagemen of the rollers 14 with the walls of the longitiudinal guide slots 15. As the spindle portion 4 moves outwardly, the rollers 11 carried thereby, by their action on the walls of the helical slots 12, 12' cause the sleeve 10 to turn until such rollers reach the outer (upper) ends of said slots. Inasmuch as the sleeve is only turned about its axis, but not shifted lengthwise, the inner spindle section 3, rigidly connected with said sleeve 10, will likewise be turned about its axis, without any longtudinal movement. This rotation of the spindle portion 3 will, by the action of the cams 6 on the arms 7, move the valves 8 off their seats and toward each other (horizontally when the spindle 3, 4 is vertical as shown), thus opening the valves as in Fig. 2. The friction between the rollers 11 and the walls of the slots 12, 12', during the upward or outward movement of said rollers, has a tendency to move the sleeve 10 outwardly and thus to produce a like movement of the spindle portion 3 and the valves 8; in order to prevent such movement, I have provided the roller 23 which in the inner position of the spindle portion 3 is on the inner (lower) side of the partition 20 and in engagement therewith. As said spindle portion rotates, the roller 23 will travel in engagement with the partition 20, which thus acts as a stop to prevent outward movement of the spindle portion 3, until the said roller 23 comes in registry with the enlargement 22 of the perforation 21, which occurs at the moment that the rollers 11 have reached the outer ends of the slots 12, 12' and the two spindle portions 3, 4 are therefore, coupled to move outwardly in unison. Thus, continued rotation of the handwheel 27 will cause both spindle portions to move outwardly, thereby carrying the valves 8 from the position Fig. 2 to the position Fig. 1, the roller 23 during such movement passing through the partition 20, at the enlargement 22 of the perforation 21. A clear unobstructed path is thus provided for the passage of the fluid. During its outward movement, the sleeve 10 is prevented from rotating, by the engagement of the roller 18 with the walls of the corresponding longitudinal slot 15.

It will be noted that by turning a single hand-wheel the operator will produce all the necessary movements of the valves 8, that is, both their movement toward and from their seats, in line with the path of the fluid, and their movement in a line transverse to such path. I thus avoid the complication of two separate mechanisms and the inconvenience of compelling the operator to change his position according as he wishes to manipulate one or the other of such separate mechanisms.

Instead of a screw-threaded spindle, I may employ one provided with rack teeth, the parts cooperating therewith being altered correspondingly. Such an arrangement is shown in Fig. 7, where the spindle has a rack portion 4' in mesh with a pinion 2'' journaled in a stationary bearing and provided with an operating handle or crank 27'; at 28 I have indicated a roller engaging the spindle portion 4' on the side opposite to the rack teeth.

The pitch of the helical slots 12, 12' is selected according to the extent of the rotation it is desired to give to the spindle portion 3 and to the power required for pressing the valves 8 against their seats and removing them therefrom.

It will be understood that the sleeve 10, in conjunction with the rollers 11, constitutes means for rotating the inner spindle portion 3, to move the valves toward and from their seats, while in registry therewith; while when the valves are out of registry with their seats, rotation of the parts 10 and 3 is prevented as described above. The partition 20 acts as a stop for the roller 23 to prevent longitudinal or axial movement of the spindle portion 3 and the valves 8 as long as the latter have not been unseated fully.

While I have shown my improved mechanism in connection with two valves operated thereby simultaneously, it will be understood that the invention might be applied to operate a single valve in the manner described, and that various modifications may be made without departing from the nature of my invention as set forth in the appended claims.

The inner spindle portion may be considered an actuated member, and the outer spindle portion may be termed an actuating member.

As I have stated at the beginning of this specification, doors, porthole covers, and various other devices may be operated by means of my improved mechanical movement, which might also be used as a mechanism for carrying articles (especially heavy ones) to or from their position of use.

I claim:

1. A device of the class described, comprising a casing provided with a valve seat, an inner spindle portion extending and movable transversely of said casing, a valve adjacent to said spindle portion, a connection between said valve and said spindle portion to cause them to move in unison when said spindle portion is moved transversely of the casing to bring the valve into and out of registry with said seat, and to cause the valve, while in registry with its seat, to be moved toward and from said seat by the rotation of said spindle portion, an outer spindle portion in axial alignment with said inner spindle portion, mechanism for moving said outer spindle portion axially in and out, and connections and guiding means which during the outer portion of the said axial movement compel both spindle portions to move axially in unison, without any rotation of the valve-carrying inner spindle portion, while during the inner portion of said axial movement only the outer spindle portion will move axially, such axial movement of the outer spindle portion relatively to the inner spindle portion operating to rotate the latter and seat or unseat the valve.

2. A device of the class described, comprising a casing provided with a valve seat, a rotatable and axially movable spindle extending transversely of said casing, a valve adjacent to said spindle, a connection between said valve and said spindle to cause them to move in unison when said spindle is moved axially to bring the valve into and out of registry with said seat, and to cause the valve, while in registry with its seat, to be moved toward and from said seat by the rotation of the spindle, and unitary mechanism for imparting to said spindle successively, axial and rotary movements.

3. A device of the class described, comprising a casing provided with a valve seat, a rotatable and axially movable spindle extending transversely of said casing, a valve adjacent to said spindle, a connection between said valve and said spindle to cause them to move in unison when said spindle is moved axially to bring the valve into and out of registry with said seat, and to cause the valve, while in registry with its seat, to be moved toward and from said seat by the rotation of the spindle, a handwheel, and an operative connection by which rotation of said handwheel will impart to said spindle successively, axial and rotary movements.

4. A device of the class described, comprising a casing provided with a valve seat, an inner spindle portion extending and movable transversely of said casing, a valve adjacent to said spindle portion, a connection between said valve and said spindle portion to cause them to move in unison when said spindle portion is moved transversely of the casing to bring the valve into and out of registry with said seat, and to cause the valve, while in registry with its seat, to be moved toward and from said seat by the rotation of said spindle portion, an outer spindle portion in axial alignment with said inner spindle portion, mechanism for moving said outer spindle portion axially in and out, a sleeve connected rigidly with said inner spindle portion and provided with a helical groove, a projection on said outer spindle portion extending into said groove, and stationary guide means for preventing rotation of the outer spindle portion during its entire axial movement and for preventing rotation of the inner spindle portion during the outer portion of the axial movement of said outer spindle portion.

5. A device of the class described, comprising a casing provided with a valve seat, an inner spindle portion extending and movable transversely of said casing, a valve adjacent to said spindle portion, a connection between said valve and said spindle portion to cause them to move in unison when said spindle portion is moved transversely of the casing to bring the valve into and out of registry with said seat, and to cause the valve, while in registry with its seat, to be moved toward and from said seat by the rotation of said spindle portion, an outer spindle portion in axial alignment with said inner spindle portion, mechanism for moving said outer spindle portion axially in and out, a member connected with one of said spindle portions and provided with a helical groove, a projection on the other spindle portion extending into said groove, and guide means for preventing rotation of the outer spindle portion, during its entire axial movement and for preventing rotation of the inner spindle portion during the outer portion of the axial movement of said outer spindle portion.

6. A device of the class described, comprising a casing provided with a valve seat, an inner spindle portion extending and movable transversely of said casing, a valve adjacent to said spindle portion, a connection between said valve and said spindle portion to cause them to move in unison when said spindle portion is moved transversely of the casing to bring the valve into and out of registry with said seat, and to cause the valve, while in registry with its seat, to be moved toward and from said seat by the rotation of said spindle portion, an outer spindle portion in axial alignment with said inner spindle portion, mechanism for moving said outer spindle portion axially in and out, a stop and a co-operating projection on the inner spindle portion so positioned relatively to each other as to prevent axial movement of the inner spindle portion in all but one of the positions to which said projection may be brought by the rotary movement of said inner spindle portion, and connections and guiding means which during the outer portion of the said axial movement compel both spindle portions to move axially in unison, without any rotation of the valve-carrying inner spindle portion, while during the inner portion of said axial movement only the outer spindle portion will move axially, such axial movement of the outer spindle portion relatively to the inner spindle portion operating to rotate the latter and seat or unseat the valve.

7. A mechanical movement comprising an actuated member movable longitudinally and also having an additional motion different from its longitudinal motion, an actuating member movable lengthwise in the same direction as said actuated member, and operative means for causing the longitudinal movement of said actuating member to impart to said actuated member successively, longitudinal and said additional different motion.

8. A mechanical movement comprising an actuated member movable longitudinally and also rotatable, an actuating member movable lengthwise in the same direction as said actuated member, and operative means for causing the longitudinal movement of said actuating member to impart to said actuated member successively, longitudinal and rotary motions.

In testimony whereof, I hereunto affix my signature.

Dr. KURT KARNATH.